United States Patent
Kawato

(10) Patent No.: US 10,344,116 B2
(45) Date of Patent: Jul. 9, 2019

(54) POLYMERIZABLE COMPOSITION FOR OPTICAL MATERIAL AND USE THEREOF

(71) Applicant: MITSUI CHEMICALS, INC., Minato-ku, Tokyo (JP)

(72) Inventor: Nobuo Kawato, Kurume (JP)

(73) Assignee: MITSUI CHEMICALS, INC., Minato-Ku, Tokyo (JP)

( * ) Notice: Subject to any disclaimer, the term of this patent is extended or adjusted under 35 U.S.C. 154(b) by 212 days.

(21) Appl. No.: 15/324,615

(22) PCT Filed: Jul. 7, 2015

(86) PCT No.: PCT/JP2015/069530
§ 371 (c)(1),
(2) Date: Jan. 6, 2017

(87) PCT Pub. No.: WO2016/006606
PCT Pub. Date: Jan. 14, 2016

(65) Prior Publication Data
US 2017/0204217 A1    Jul. 20, 2017

(30) Foreign Application Priority Data
Jul. 8, 2014   (JP) .................. 2014-140780

(51) Int. Cl.
| G02B 1/04 | (2006.01) |
| C08G 18/32 | (2006.01) |
| C08G 18/38 | (2006.01) |
| C08G 18/75 | (2006.01) |
| C08G 18/76 | (2006.01) |

(52) U.S. Cl.
CPC ..... *C08G 18/3234* (2013.01); *C08G 18/3228* (2013.01); *C08G 18/3876* (2013.01); *C08G 18/758* (2013.01); *C08G 18/7642* (2013.01); *G02B 1/04* (2013.01); *G02B 1/041* (2013.01)

(58) Field of Classification Search
CPC ............ C08G 18/3234; C08G 18/3876; C08G 18/7642; C08G 18/758; C08G 18/3228; G02B 1/041; G02B 1/04
See application file for complete search history.

(56) References Cited

U.S. PATENT DOCUMENTS

| 5,087,758 A | 2/1992 | Kanemura et al. |
| 5,191,055 A | 3/1993 | Kanemura et al. |
| 7,087,698 B1 | 8/2006 | Okoroafor et al. |
| 7,098,290 B1 | 8/2006 | Okoroafor et al. |
| 7,553,925 B2 | 6/2009 | Bojkova |
| 7,687,597 B2 | 3/2010 | Bojkova |
| 7,696,296 B2 | 4/2010 | Bojkova et al. |
| 7,888,436 B2 | 2/2011 | Szymanski et al. |
| 8,273,845 B2 | 9/2012 | Meltzer et al. |
| 8,623,989 B1 | 1/2014 | Senkfor et al. |
| 8,802,770 B2 | 8/2014 | Meltzer et al. |
| 2004/0138401 A1 | 7/2004 | Bojkova et al. |
| 2007/0270548 A1 | 11/2007 | Bojkova et al. |
| 2007/0270549 A1 | 11/2007 | Szymanski et al. |
| 2008/0125525 A1 | 5/2008 | Bojkova |
| 2008/0125570 A1 | 5/2008 | Bojkova |
| 2008/0160318 A1 | 7/2008 | Bojkova et al. |
| 2009/0192262 A1 | 7/2009 | Meltzer et al. |
| 2010/0056682 A1 | 3/2010 | Meltzer et al. |
| 2012/0088895 A1 | 4/2012 | Zalich et al. |
| 2012/0224139 A1 | 9/2012 | Retsch, Jr. |
| 2013/0344340 A1 | 12/2013 | Senkfor et al. |
| 2014/0171612 A1 | 6/2014 | Bojkova et al. |

FOREIGN PATENT DOCUMENTS

| JP | 9-110956 A | 4/1997 |
| JP | 9-263622 A | 10/1997 |
| JP | 2003-514934 A | 4/2003 |
| JP | 2011-505429 A | 2/2011 |
| WO | WO 01/36507 A1 | 5/2001 |
| WO | WO 01/36508 A1 | 5/2001 |
| WO | 2009/006034 A1 | 1/2009 |
| WO | WO 2009-094332 A2 | 7/2009 |

OTHER PUBLICATIONS

International Search Report (PCT/ISA/210) dated Oct. 13, 2015, by the Japanese Patent Office as the International Searching Authority for International Application No. PCT/JP2015/069530.
Written Opinion (PCT/ISA/237) dated Oct. 13, 2015, by the Japanese Patent Office as the International Searching Authority for International Application No. PCT/JP2015/069530.
Extended Search Report issued by the European Patent Office in corresponding European Patent Application No. 15819476.1-1302 dated Jan. 5, 2018 (7 pages).

*Primary Examiner* — Rabon A Sergent
(74) *Attorney, Agent, or Firm* — Buchanan, Ingersoll & Rooney PC

(57) ABSTRACT

Provided is a polymerizable composition for an optical material including (A) a bifunctional amine having two secondary amino groups, (B) a bifunctional thiol having two mercapto groups, and (C) a bifunctional isocyanate having two isocyanato groups, in which the ratio ((a+b)/c) of the total molar number (a+b) of the molar number a of amino groups in the amine (A) and the molar number b of mercapto groups in the thiol (B) with respect to the molar number c of isocyanato groups in the isocyanate (C) is in the range of 0.85 to 1.15, and the ratio (a/c) of the molar number a of amino groups in the amine (A) with respect to the molar number c of isocyanato groups in the isocyanate (C) is in the range of 0.10 to 0.60.

15 Claims, No Drawings

POLYMERIZABLE COMPOSITION FOR OPTICAL MATERIAL AND USE THEREOF

TECHNICAL FIELD

The present invention relates to a polymerizable composition for an optical material with which a thiourethane urea molded product is obtained and a process for producing the same.

BACKGROUND ART

Plastic lenses are lightweight, less fragile, and dyeable, as compared with inorganic lenses. For these reasons, plastic lenses for use in eyeglasses and sunglasses have become widespread. A variety of resins have heretofore been developed and used. Representative examples among them include allyl resins obtained from diethylene glycol bis-allyl carbonates and diallyl isophthalates, and (meth)acrylic resins obtained from (meth)acrylates. Examples of higher refractive index resins include thiourethane resins obtained from isocyanates and thiols (Patent Document 1).

In recent years, attention has been focused on a thermoplastic resin which is a recyclable material, as an Earth-friendly eco-material. A thermoplastic resin exhibits being readily moldable from pellets and therefore affords high productivity, which can significantly contribute to the reduction in costs of products. Due to the transportability of a thermoplastic resin in the form of pellets, it is possible to reduce the safety risk as compared with the case of transferring liquid monomers.

A urethane resin (TPU) consisting of a bifunctional isocyanate and an alcohol is known as a thermoplastic resin. Further, a urethane urea resin having a higher heat resistance than a urethane resin, and consisting of a bifunctional isocyanate, an alcohol and an amine has been developed (Patent Documents 2 to 5).

RELATED DOCUMENTS

Patent Documents

[Patent Document 1] Japanese Laid-open Patent Publication No. H09-110956
[Patent Document 2] Japanese Laid-open Patent Publication No. H09-263622
[Patent Document 3] Pamphlet of International Publication No. WO 2009/094332
[Patent Document 4] Pamphlet of International Publication No. WO 2001/03650
[Patent Document 5] Pamphlet of International Publication No. WO 2001/036508

SUMMARY OF THE INVENTION

Since urethane urea resins are highly hygroscopic, lenses made of a urethane urea resin and having a thin center thickness for use in eyeglasses or the like may be susceptible to deformation at the center plane thereof during long-term storage. In addition, since urethane urea resins have low chemical resistance, when a hard coating solution is applied onto a urethane urea resin lens, the methanol solvent contained in the solution may result in a rough surface of the lens, or dissolved resin may contaminate the hard coating solution itself. Further, there may be cases where the lens surface becomes eroded when the lens surface is cleaned with a solvent such as methanol, after dyeing of the lens.

In view of these problems of the related art, the present inventors have conducted extensive studies to develop a polymerizable composition which is capable of providing a thiourethane urea molded product, which is comprised of a thermoplastic resin, having excellent moisture absorption resistance, excellent chemical resistance, and low surface deformation during long-term storage.

The present inventors have found that it is possible to solve the above-mentioned problems by using specific amines, thiols, and isocyanates in a ratio in a predetermined range. The present invention has been completed based on such a finding.

The present invention can be described as follows.

[1] A polymerizable composition for an optical material, including:
  (A) a bifunctional amine having two secondary amino groups;
  (B) a bifunctional thiol having two mercapto groups; and
  (C) a bifunctional isocyanate having two isocyanato groups,
in which the ratio ((a+b)/c) of the total molar number (a+b) of the molar number a of amino groups in the amine (A) and the molar number b of mercapto groups in the thiol (B) with respect to the molar number c of isocyanato groups in the isocyanato (C) is in the range of 0.85 to 1.15, and the ratio (a/c) of the molar number a of amino groups in the amine (A) with respect to the molar number c of isocyanato groups in the isocyanate (C) is in the range of 0.10 to 0.60.

[2] The polymerizable composition for an optical material according to [1], in which the amine (A) is one or more compounds selected from a secondary aliphatic amine, a secondary alicyclic amine, and a secondary aromatic amine.

[3] The polymerizable composition for an optical material according to [1] or [2], in which the amine (A) has two secondary amino groups represented by the formula: —NHR, and two R's may be the same or different from each other and are selected from an isopropyl group, a 1,2,2-trimethylpropyl group, a tert-butyl group, a sec-butyl group, and a 1,3-dimethylbutyl group.

[4] The polymerizable composition for an optical material according to any one of [1] to [3], in which the amine (A) is one or more compounds selected from N,N'-di-tert-butyl-ethylenediamine,
N,N'-di(1,2,2-trimethylpropyl)-1,6-hexamethylenediamine,
N,N'-di-isopropyl-m-xylylenediamine,
N,N'-di-sec-butyl-m-xylylenediamine,
N,N'-(cyclohexyl-1,3-diylbis(methylene))bis(isopropyl-2-amine),
N,N'-(cyclohexyl-1,3-diylbis(methylene))bis(sec-propyl-2-amine),
N,N'-(cyclohexyl-1,4-diylbis(methylene))bis(isopropyl-2-amine),
N,N'-(cyclohexyl-1,4-diylbis(methylene))bis(sec-propyl-2-amine),
N,N'-di-isopropyl-isophorone diamine,
N,N'-di-sec-butyl-4,4'-methylene-bis(cyclohexylamine),
N,N'-di-sec-butyl-4,4'-methylene-bis(2-methylcyclohexylamine),
N,N'-di-isopropyl-2,5-diaminomethyl-bicyclo[2.2.1]heptane,
N,N'-di-sec-butyl-2,5-diaminomethyl-bicyclo[2.2.1]heptane,
N,N'-di-isopropyl-2,6-diaminomethyl-bicyclo[2.2.1]heptane,
N,N'-di-sec-butyl-2,6-diaminomethyl-bicyclo[2.2.1]heptane, and
N,N'-di-sec-butyl-4,4'-diaminodiphenylmethane.

[5] The polymerizable composition for an optical material according to any one of [1] to [4], in which the thiol (B) is one or more compounds selected from ethylene glycol bis(3-mercaptopropionate), tetraethylene glycol bis(3-mercaptopropionate), and bis(2-mercaptoethyl)sulfide.

[6] The polymerizable composition for an optical material according to any one or [1] to [5], in which the isocyanate (C) is one or more compounds selected from m-xylylene diisocyanate, 2,5-bis(isocyanatomethyl)bicyclo[2.2.1]heptane, 2,6-bis(isocyanatomethyl)bicyclo[2.2.1]heptane, 1,3-bis(isocyanatomethyl)cyclohexane, 1,4-bis(isocyanatomethyl)cyclohexane, isophorone diisocyanate, 4,4'-methylene-bis(cyclohexyl isocyanate), 1,5-pentane diisocyanate, 1,6-hexamethylene diisocyanate, 2,4-tolylene diisocyanate, and 2,6-tolylene diisocyanate.

[7] The polymerizable composition for an optical material according to any one of [1] to [6], in which the ratio (a/c) of the molar number a of amino groups in the amine (A) with respect to the molar number c of isocyanato groups in the isocyanate (C) is in the range of 0.10 to 0.50.

[8] The polymerizable composition for an optical material according to any one of [1] to [7], in which the ratio ((a+b)/c) of the total molar number (a+b) of the molar number a of amino groups in the amine (A) and the molar number b of mercapto groups in the thiol (B) with respect to the molar number c of isocyanato groups in the isocyanate (C) is in the range of 0.90 to 1.10.

[9] A thermoplastic resin composition obtained by polymerizing the polymerizable composition for an optical material according to any one of [1] to [8].

[10] A molded product obtained from the polymerizable composition for an optical material according to any one of [1] to [8].

[11] An optical material made of the molded product according to [10].

[12] A plastic lens made of the molded product according to [10].

[13] A process for producing a polymerizable composition for an optical material, including:
a step (i) of preparing a solution containing an isocyanate (C); and
a step (ii) of adding and mixing an amine (A) and a thiol (B) into the solution,
in which the ratio ((a+b)/c) of the total molar number (a+b) of the molar number a of amino groups in the amine (A) and the molar number b of mercapto groups in the thiol (B) with respect to the molar number c of isocyanato groups in the isocyanate (C) is in the range of 0.85 to 1.15, and the ratio (a/c) of the molar number a of amino groups in the amine (A) with respect to the molar number c of isocyanato groups in the isocyanate (C) is in the range of 0.10 to 0.60.

[14] The process for producing a polymerizable composition for an optical material according to [13], in which the amine (A) is one or more compounds selected from a secondary aliphatic amine, a secondary alicyclic amine, and a secondary aromatic amine.

[15] The process for producing a polymerizable composition for an optical material according to [13] or [14], in which the amine (A) has two secondary amino groups represented by the formula: —NHR, and two R's may be the same or different from each other and are selected from an isopropyl group, a 1,2,2-trimethylpropyl group, a tert-butyl group, a sec-butyl group, and a 1,3-dimethylbutyl group.

[16] The process for producing a polymerizable composition for an optical material according to any one of [13] to [15], in which the amine (A) is one or more compounds selected from N,N'-di-tert-butyl-ethylenediamine,
N,N'-di(1,2,2-trimethylpropyl)-1,6-hexamethylenediamine,
N,N'-di-isopropyl-m-xylylenediamine,
N,N'-di-sec-butyl-m-xylylenediamine,
N,N'-(cyclohexyl-1,3-diylbis(methylene))bis(isopropyl-2-amine),
N,N'-(cyclohexyl-1,3-diylbis(methylene))bis(sec-propyl-2-amine),
N,N'-(cyclohexyl-1,4-diylbis(methylene))bis(isopropyl-2-amine),
N,N'-(cyclohexyl-1,4-diylbis(methylene))bis(sec-propyl-2-amine),
N,N'-di-isopropyl-isophorone diamine,
N,N'-di-sec-butyl-4,4'-methylene-bis(cyclohexylamine),
N,N'-di-sec-butyl-4,4'-methylene-bis(2-methylcyclohexylamine),
N,N'-di-isopropyl-2,5-diaminomethyl-bicyclo[2.2.1]heptane,
N,N'-di-sec-butyl-2,5-diaminomethyl-bicyclo[2.2.1]heptane,
N,N'-di-isopropyl-2,6-diaminomethyl-bicyclo[2.2.1]heptane,
N,N'-di-sec-butyl-2,6-diaminomethyl-bicyclo[2.2.1]heptane, and
N,N'-di-sec-butyl-4,4'-diaminodiphenylmethane.

According to the polymerizable composition for an optical material of the present invention, it is possible to obtain a thiourethane urea molded product, which is comprised of a thermoplastic resin, having excellent moisture absorption resistance, excellent chemical resistance, and low surface deformation during long-term storage. Such a thiourethane urea melded product is suitably used in a variety of optical materials where high transparency is required.

DESCRIPTION OF EMBODIMENTS

Hereinafter, the polymerizable composition for an optical material according to the present invention will be described with reference to specific examples.

The polymerizable composition for an optical material according to the present invention contains (A) a bifunctional amine having two secondary amino groups (hereinafter, simply referred to as amine (A)), (B) a bifunctional thiol having two mercapto groups (hereinafter, simply referred to as thiol (B)), and (C) a bifunctional isocyanate having two isocyanato groups (hereinafter, simply referred to as isocyanate (C)).

[Amine (A)]

The amine (A) is a bifunctional amine having two secondary amino groups, and examples thereof include a secondary aliphatic amine, a secondary alicyclic amine, a secondary aromatic amine, and a combination thereof.

Examples of the aliphatic amine include N,N'-dimethylethylenediamine, N,N'-di-isopropyl-ethylenediamine, N,N'-di-sec-butyl-ethylenediamine, N,N'-di-tert-butyl-ethylenediamine, N,N'-dimethyl-1,2-diaminopropane, N,N'-dimethyl-1,3-diaminopropane, N,N'-dimethyl-1,2-diaminobutane, N,N'-dimethyl-1,3-diaminobutane, N,N'-dimethyl-1,4-diaminobutane, N,N'-dimethyl-1,5-diaminopentane, N,N'-dimethyl-1,6-diaminohexane, N,N'-di-isopropyl-1,6-diaminohexane, N,N'-di-sec-butyl-1,6-diaminohexane, N,N'-di(1,2,2-trimethylpropyl)-1,6-diaminohexane, N,N'-dimethyl-1,7-diaminoheptane, N,N'-di-isopropyl-m-xylylenediamine, and N,N'-di-sec-butyl-m-xylylenediamine, and the like. The aliphatic amine may be at least one selected from these compounds.

Examples of the alicyclic amine include N,N'-(cyclohexyl-1,3-diylbis(methylene))bis(isopropyl-2-amine), N,N'-(cyclohexyl-1,3-diylbis(methylene))bis(sec-propyl-2-amine), N,N'-(cyclohexyl-1,4-diylbis(methylene))bis(isopropyl-2-amine), N,N'-(cyclohexyl-1,4-diylbis(methylene))bis(sec-propyl-2-amine), N,N'-di-isopropyl-isophorone diamine, N,N'-di-sec-butyl-isophorone diamine, piperazine, 2-methylpiperazine, 2,5-dimethylpiperazine, 2,6-dimethylpiperazine, N,N'-di-isopropyl-4,4'-methylene-bis(cyclohexylamine), N,N'-di-sec-butyl-4,4'-methylene-bis(cyclohexylamine), N,N'-di-isopropyl-4,4'-methylene-bis(2-methylcyclohexylamine), N,N'-di-sec-butyl-4,4'-methylene-bis(2-methylcyclohexylamine), N,N'-di-isopropyl-2,5-diaminomethyl-bicyclo[2.2.1]heptane, N,N'-di-sec-butyl-2,5-diaminomethyl-bicyclo[2.2.1]heptane, N,N'-di-isopropyl-2,6-diaminomethyl-bicyclo[2.2.1]heptane, and N,N'-di-sec-butyl-2,6-diaminomethyl-bicyclo[2.2.1]heptane, and the like. The alicyclic amine may be at least one selected from these compounds.

Examples of the aromatic amine include N,N'-di-isopropyl-4,4'-diaminodiphenylmethane, N,N'-di-sec-butyl-4,4'-diaminodiphenylmethane, N,N'-di-isopropyl-2,4-diaminotoluene, and N,N'-di-sec-butyl-2,4-diaminotoluene, and the like. The aromatic amine may be at least one selected from these compounds.

The amine (A) may be a compound having two or more secondary amino groups represented by the formula: —NHR. In the formula, two or more R's may be the same or different from each other and may be selected from an isopropyl group, a 1,2,2-trimethylpropyl group, a tert-butyl group, a sec-butyl group, and a 1,3-dimethylbutyl group.

Such an amine (A) is preferably at least one selected from
N,N'-di-tert-butyl-ethylenediamine,
N,N'-di(1,2,2-trimethylpropyl)-1,6-hexamethylenediamine,
N,N'-di-isopropyl-m-xylylenediamine,
N,N'-di-sec-butyl-m-xylylenediamine,
N,N'-(cyclohexyl-1,3-diylbis(methylene))bis(isopropyl-2-amine),
N,N'-(cyclohexyl-1,3-diylbis(methylene))bis(sec-propyl-2-amine),
N,N'-(cyclohexyl-1,4-diylbis(methylene))bis(isopropyl-2-amine),
N,N'-(cyclohexyl-1,4-diylbis(methylene))bis(sec-propyl-2-amine),
N,N'-di-isopropyl-isophorone diamine,
N,N'-di-sec-butyl-4,4'-methylene-bis(cyclohexylamine),
N,N'-di-sec-butyl-4,4'-methylene-bis(2-methylcyclohexylamine),
N,N'-di-isopropyl-2,5-diaminomethyl-bicyclo[2.2.1]heptane,
N,N'-di-sec-butyl-2,5-diaminomethyl-bicyclo[2.2.1]heptane,
N,N'-di-isopropyl-2,6-diaminomethyl-bicyclo[2.2.1]heptane,
N,N'-di-sec-butyl-2,6-diaminomethyl-bicyclo[2.2.1]heptane, and
N,N'-di-sec-butyl-4,4-diaminodiphenylmethane,
more preferably at least one selected from
N,N'-di-tert-butyl-ethylenediamine,
N,N'-di(1,2,2-trimethylpropyl)-1,6-hexamethylenediamine,
N,N'-di-sec-butyl-4,4'-methylene-bis(cyclohexylamine),
N,N'-di-isopropyl-isophorone diamine, and
N,N'-di-sec-butyl-4,4'-diaminodiphenylmethane, and
particularly preferably at least one selected from
N,N'-di-tert-butyl-ethylenediamine,
N,N'-di(1,2,2-trimethylpropyl)-1,6-hexamethylenediamine,
N,N'-di-sec-butyl-4,4'-methylene-bis(cyclohexylamine), and
N,N'-di-isopropyl-isophorone diamine.

In the case of using an amine having two or more primary amino groups as the amine, a resin obtained by crosslinking does not exhibit thermoplasticity since the primary amino groups react with two isocyanato groups.

[Thiol (B)]

The thiol (B) is a bifunctional thiol having two mercapto groups, and examples thereof include an aliphatic thiol, an aromatic thiol, and a combination thereof.

Examples of the aliphatic thiol include methanedithiol, 1,2-ethanedithiol, 1,2-propanedithiol, 1,3-propanedithiol, 1,4-butanedithiol, 1,5-pentanedithiol, 1,6-hexanedithiol, 1,2-cyclohexanedithiol, 3,4-dimethoxybutane-1,2-dithiol, 2-methylcyclohexane-2,3-dithiol, 1,2-dimercaptopropyl methyl ether, 2,3-dimercaptopropyl methyl, ether, bis(2-mercaptoethyl)ether, bis(mercaptomethyl)sulfide, bis(mercaptomethyl)disulfide, bis(mercaptoethyl)sulfide, bis(mercaptoethyl)disulfide, bis(mercaptomethylthio)methane, bis(2-mercaptoethylthio)methane, 1,2-bis(mercaptomethylthio)ethane, 1,2-bis(2-mercaptoethylthio)ethane, 1,3-bis(mercaptomethylthio)propane, 1,3-bis(2-mercaptoethylthio)propane, 4,6-bis(mercaptomethylthio)-1,3-dithiane, 2-(2,2-bis(mercaptomethylthio)ethyl)-1,3-dithietane, 2,5-dimercapto-1,4-dithiane, ethylene glycol bis(2-mercaptoacetate), ethylene glycol bis(3-mercaptopropionate), diethylene glycol bis(2-mercaptoacetate), diethylene glycol bis(3-mercaptopropionate), 1,4-cyclohexanediol bis(2-mercaptoacetate), and 1,4-cyclohexanediol bis(3-mercaptopropionate), and the like. The aliphatic thiol may be at least one selected from these compounds.

Examples of the aromatic thiol include 1,2-dimercaptobenzene, 1,3-dimercaptobenzene, 1,4-dimercaptobenzene, 1,2-bis(mercaptomethyl)benzene, 1,4-bis(mercaptomethyl)benzene, 1,2-bis(mercaptoethyl)benzene, 1,4-bis(mercaptoethyl)benzene, 2,5-toluenedithiol, 3,4-toluenedithiol, 1,4-naphthalenedithiol, 1,5-naphthalenedithiol, 2,6-naphthalenedithiol, 2,7-naphthalenedithiol, 2,2'-dimercaptobiphenyl, and 4,4'-dimercaptobiphenyl, and the like. The aromatic thiol compound may be at least one selected from these compounds.

Among these exemplified compounds, preferred is at least one selected from 1,2-ethanedithiol, 1,4-butanedithiol, 1,6-hexanedithiol, bis(mercaptoethyl)disulfide, ethylene glycol bis(2-mercaptoacetate), 1,3-dimercaptobenzene, 1,4-dimercaptobenzene, ethylene glycol bis(3-mercaptopropionate), tetraethylene glycol bis(3-mercaptopropionate), and bis(2-mercaptoethyl)sulfide, more preferred is at least one selected from ethylene glycol bis(3-mercaptopropionate), tetraethylene glycol bis(3-mercaptopropionate), and bis(2-mercaptoethyl)sulfide, and particularly preferred is at least one selected from ethylene glycol bis(3-mercaptopropionate) and bis(2-mercaptoethyl)sulfide.

[Isocyanate (C)]

The isocyanate (C) is a bifunctional, isocyanate having two isocyanato groups, and examples thereof include an aliphatic isocyanate, an alicyclic isocyanate, an aromatic isocyanate, a heterocyclic isocyanate, and a combination thereof.

Examples of the aliphatic isocyanate include 2,2,4-trimethylhexane diisocyanate, 2,4,4-trimethylhexane diisocyanate, lysine diisocyanato methyl ester, m-xylylene diisocyanate, $\alpha,\alpha,\alpha',\alpha'$-tetramethylxylylene diisocyanate, bis (isocyanatomethyl)naphthalene, bis(isocyanatomethyl) sulfide, bis(isocyanatoethyl)sulfide, bis(isocyanatomethyl) disulfide, bis(isocyanatoethyl)disulfide, bis(isocyanatomethylthio)methane, bis(isocyanatoethylthio) methane, bis(isocyanatomethylthio)ethane, bis(isocyanatoethylthio)ethane, 1,5-pentane diisocyanate, an allophanate-modified product of 1,5-pentane diisocyanate, 1,6-hexamethylene diisocyanate, and an allophanate-modified product of 1,6-hexamethylene diisocyanate, and the like. The aliphatic isocyanate may be at least one selected from these compounds.

Examples of the alicyclic isocyanate include isophorone diisocyanate, 1,3-bis(isocyanatomethyl)cyclohexane, 1,4-bis(isocyanatomethyl)cyclohexane, 4,4'-methylene-bis(cyclohexyl isocyanate), methylcyclohexane diisocyanate, 2,5-bis(isocyanatomethyl)bicyclo[2.2.1]heptane, 2,6-bis(isocyanatomethyl)bicyclo[2.2.1]heptane, 3,8-bis(isocyanatomethyl)tricyclodecane, 3,9-bis(isocyanatomethyl)tricyclodecane, 4,8-bis(isocyanatomethyl)tricyclodecane, and 4,9-bis(isocyanatomethyl)tricyclodecane, and the like. The alicyclic isocyanate may be at least one selected from these compounds.

Examples of the aromatic isocyanate include naphthalene diisocyanate, m-phenylene diisocyanate, p-phenylene diisocyanate, 2,4-tolylene diisocyanate, 2,6-tolylene diisocyanate, biphenyl diisocyanate, 4,4'-diphenylmethane diisocyanate, 2,4'-diphenylmethane diisocyanate, and 2,2'-diphenylmethane diisocyanate, and the like. The aromatic isocyanate may be at least one selected from these compounds.

Examples of the heterocyclic isocyanate include 2,5-diisocyanatothiophene, 2,5-bis(isocyanatomethyl)thiophene, 2,5-diisocyanatotetrahydrothiophene, 2,5-bis(isocyanatomethyl)tetrahydrothiophene, 3,4-bis(isocyanatomethyl) tetrahydrothiophene, 2,5-diisocyanato-1,4-dithiane, 2,5-bis(isocyanatomethyl)-1,4-dithiane, 4,5-diisocyanato-1,3-dithiolane, and 4,5-bis(isocyanatomethyl)-1,3-dithiolane, and the like. The heterocyclic isocyanate may be at least one selected from these compounds.

Among these exemplified compounds, preferred is at least one selected from m-xylylene diisocyanate, 2,5-bis(isocyanatomethyl)bicyclo[2.2.1]heptane, 2,6-bis(isocyanatomethyl)bicyclo[2.2.1]heptane, 1,3-bis(isocyanatomethyl)cyclohexane, 1,4-bis(isocyanatomethyl)cyclohexane, isophorone diisocyanate, 4,4'-methylene-bis(cyclohexyl isocyanate), 1,5-pentane diisocyanate, an allophanate-modified product of 1,5-pentane diisocyanate, 1,6-hexamethylene diisocyanate, an allophanate-modified product of 1,6-hexamethylene diisocyanate, 2,4-tolylene diisocyanate, and 2,6-tolylene diisocyanate, more preferred is at least one selected from m-xylylene diisocyanate, 2,5-bis(isocyanatomethyl)bicyclo[2.2.1]heptane, 2,6-bis(isocyanatomethyl)bicyclo[2.2.1]heptane, 1,3-bis(isocyanatomethyl)cyclohexane, 1,4-bis(isocyanatomethyl)cyclohexane, isophorone diisocyanate, 4,4'-methylene-bis(cyclohexyl isocyanate), 1,5-pentane diisocyanate, 1,6-hexamethylene diisocyanate, 2,4-tolylene diisocyanate, and 2,6-tolylene diisocyanate, particularly preferred is at least one selected from m-xylylene diisocyanate, 2,5-bis(isocyanatomethyl)bicyclo[2.2.1]heptane, 2,6-bis(isocyanatomethyl)bicyclo[2.2.1] heptane, 1,3-bis(isocyanatomethyl)cyclohexane, 1,4-bis(isocyanatomethyl)cyclohexane, and 4,4'-methylene-bis (cyclohexyl isocyanate), and more particularly preferred is at least one selected from 2,5-bis(isocyanatomethyl)bicyclo[2.2.1]heptane, 2,6-bis (isocyanatomethyl)bicyclo[2.2.1]heptane, 1,3-bis(isocyanatomethyl)cyclohexane, and 1,4-bis(isocyanatomethyl)cyclohexane.

[Other Components]

Depending on the purpose, the polymerizable composition for an optical material according to the present invention may contain additives such as a polymerization catalyst, an internal mold release agent, an ultraviolet absorber, a light stabilizer, an antioxidant, an anti-coloring agent, a dye, and a resin modifier.

Examples of the polymerization catalyst that can be used include a Lewis acid, an amine, an organic acid, and an amine organic acid salt, and the like. Preferred are a Lewis acid, an amine, and an amine organic acid salt, and more preferred are dimethyl tin chloride, dibutyl tin chloride, and dibutyl tin laurate. The amount of the polymerization catalyst to be added is preferably 0.005 parts by weight to 0.5 parts by weight, and more preferably 0.005 parts by weight to 0.3 parts by weight, with respect to 100 parts by weight of the polymerizable composition.

As the internal mold release agent, an acidic phosphoric acid ester may be used. Examples of the acidic phosphoric acid ester include a phosphoric acid monoester and a phosphoric acid diester, which may be used alone or in combination of two or more thereof. Preferred are internal mold release agents for MR manufactured by Mitsui Chemicals, Inc., Zelec UN manufactured by STEPAN Company, a JP series manufactured by JOHOKU CHEMICAL CO., LTD., a Phosphanol series manufactured by TOHO Chemical Industry Co., Ltd., an AP or DP series manufactured by DAIHACHI CHEMICAL INDUSTRY CO., LTD., and the like, and more preferred are internal mold release agents for MR manufactured by Mitsui Chemicals, Inc. and Zelec UN manufactured by STEPAN Company. The amount of the internal mold release agent to be added is preferably 0.05 parts by weight to 1.0 part by weight, and more preferably 0.06 parts by weight to 0.5 parts by weight, with respect to 100 parts by weight of the polymerizable composition.

The ultraviolet absorber is preferably a benzotriazole compound, a triazine compound, a benzophenone compound, or a benzoate compound, and more preferably a benzotriazole compound. The amount of the ultraviolet absorber to be added is preferably 0.05 parts by weight to 2.5 parts by weight, and more preferably 0.05 parts by weight to 2.0 parts by weight, with respect to 100 parts by weight of the polymerizable composition.

The resin modifier does not include an alcohol and an episulfide. Since an alcohol increases the moisture absorption of a resin, a lens containing an alcohol as the resin modifier is prone to surface deformation during long-term storage and further the chemical resistance of the resin may be decreased in some cases. Since the episulfide exhibits excessively high reactivity with the amine (A), striae may occur in the resin obtained by uneven curing, and the transparency of the resin may be deteriorated.

In the polymerizable composition for an optical material according to the present invention, from the viewpoint of the above-mentioned effects, it is preferred to use any combination of exemplified compounds as the amine (A), the thiol (B), and the isocyanate (C).

In the polymerizable composition for an optical material according to the present invention, the ratio ((a+b)/c) of the total molar number (a+b) of the molar number a of amino groups in the amine (A) and the molar number b of mercapto groups in the thiol (B) with respect to the molar number c of isocyanato groups in the isocyanate (C) is in the range ratio of 0.85 to 1.15, preferably in the range of 0.90 to 1.15, and more preferably in the range of 0.90 to 1.10.

The ratio (a/c) of the molar number a of amino groups in the amine (A) with respect to the molar number c of isocyanato groups in the isocyanate (C) is in the range of 0.10 to 0.60, preferably in the range of 0.10 to 0.55, and more preferably in the range of 0.10 to 0.50.

These molar ratios may be appropriately selected and combined.

When the amine (A), the thiol (B), and the isocyanate (C) are combined and all of the above-specified molar ratios are satisfied, it is possible to suitably obtain a thiourethane urea molded product, which is comprised of a thermoplastic resin, having excellent moisture absorption resistance, excellent chemical resistance, and low surface deformation during long-term storage, that is, a thiourethane urea molded product having a superior balance of these properties. The polymerizable composition for an optical material according to the present invention can exhibit the effect of the present invention as described above, and can provide a resin suitable as an eyeglass lens.

<Process for Producing Polymerizable Composition for Optical Material>

The process for producing a polymerizable composition for an optical material according to the present invention includes a step (i) of preparing a solution containing a bifunctional isocyanate (C) having two isocyanato groups, and a step (ii) of adding and mixing a bifunctional amine (A) having two secondary amino groups and a bifunctional thiol (B) having two mercapto groups into the solution.

In the process for producing a polymerizable composition for an optical material according to the present invention, the ratio ((a+b)/c) of the total molar number (a+b) of the molar number a of amino groups in the amine (A) and the molar number b of mercapto groups in the thiol (B) with respect to the molar number c of isocyanato groups in the isocyanate (C) is in the range of 0.85 to 1.15, preferably in the range of 0.90 to 1.15, and more preferably in the range of 0.90 to 1.10.

The ratio (a/c) of the molar number a of amino groups in the amine (A) with respect to the molar number c of isocyanato groups in the isocyanate (C) is in the range of 0.10 to 0.60, preferably in the range of 0.10 to 0.55, and more preferably in the range of 0.10 to 0.50.

These molar ratios may be appropriately selected and combined.

Hereinafter, individual steps will be described.

[Step (i)]

In the step (i), the isocyanate (C) and additives are mixed to prepare a homogeneous solution. Although different depending on the type of the isocyanate (C) and additives to be used, there is an example of a method of adding additives such as a polymerization catalyst, an internal mold release agent, and an ultraviolet absorber to the isocyanate (C). The polymerization catalyst may be added by using a master solution containing the isocyanate (C) and it. The polymerization temperature varies depending on the type and the amount of the compound and additives to be used and is appropriately selected in consideration of operability, safety, convenience, and the like. In the case where the solubility of the additives into the isocyanate (C) is not good, the additives may be previously heated and then mixed.

[Step (ii)]

In the step (ii), the amine (A) and the thiol (B) are added and mixed in the solution obtained in the step (i). In other words, the thiol (B) and the isocyanate (C) can be prepared in one pot without prepolymerization of these. Although varying depending on the type of the amine (A), the thiol (B), and the isocyanate (C) to be used, for example, there is a method where the thiol (B), and the amine (A) are added in this order to the solution obtained in the step (i), or a method where the amine (A), the thiol (B), and the solution obtained in the step (i) are mixed at the same time.

The mixing means is not particularly limited, and a mixing tank, a mixing-discharging device such as a dispenser, a rotating single or twin-screw extruder, or the like is used. The mixing temperature and time are not particularly limited, and it is preferred to carry out the mixing with stirring at 20° C. to 280° C. for 1 minute to 1 hour. Depending on physical properties required for the resulting resin, it is preferred to carry out a degassing treatment under reduced pressure, a filtration treatment such as pressurization or depressurization, or the like, if necessary.

The conditions for the polymerization method of a polymerizable composition for an optical material according to the present invention significantly vary depending on the type of the compound and the catalyst to be used, and the polymerization is carried out at 20° C. to 280° C. over a period of 1 minute to 50 hours. In some cases, the polymerization is carried out by holding or gradually heating in the temperature range of 20° C. to 140° C. and curing for 1 to 48 hours.

As described above, it is possible to obtain a thermoplastic resin composition containing a thiourethane urea resin by polymerizing the polymerizable composition for an optical material.

The thiourethane urea resin contained in thermoplastic resin composition of the present invention includes:

(A1) a bifunctional amine-derived constitutional unit having two secondary amino groups, (B1) a bifunctional thiol-derived constitutional unit having two mercapto groups, and (C1) a bifunctional isocyanate-derived constitutional unit having two isocyanato groups.

In the thiourethane urea resin, the ratio ((a1+b1)/c1) of the total molar number (a1+b1) of the molar number a1 of amino groups in the constitutional unit (A1) and the molar number b1 of mercapto groups in the constituent unit (B1) with respect to the molar number c1 of isocyanato groups in the constitutional unit (C1) is in the range of 0.85 to 1.15, preferably in the range of 0.90 to 1.15, and more preferably in the range of 0.90 to 1.10.

Further, in the thiourethane urea resin, the ratio (a1/c1) of the molar number a1 of amino groups in the constitutional unit (A1) with respect to the molar number c1 of isocyanato groups in the constitutional unit (C1) is in the range of 0.10 to 0.60, preferably in the range of 0.10 to 0.55, and more preferably in the range of 0.10 to 0.50.

These molar ratios may be appropriately selected and combined.

Incidentally, the thermoplastic resin composition includes a pellet-shaped composition.

When all of the above-specified molar ratios are satisfied, it is possible to suitably obtain a thiourethane urea molded product, which is comprised of a thermoplastic resin, having excellent moisture absorption resistance, excellent chemical resistance, and low surface deformation during long-term storage, that is, a thiourethane urea molded product having a superior balance of such properties. The polymerizable composition for an optical material according to the present invention can exhibit the effect of the present invention as described above, and can provide a resin suitable as an eyeglass lens.

Examples of the method for molding a molded product obtained from the polymerizable composition for an optical material according to the present invention include cast molding, press molding, and injection molding which are known methods for molding a thermoplastic resin composition. The molding temperature conditions significantly vary depending on the type of resin to be used, and the molding temperature is 170° C. to 300° C., preferably 200° C. to 300° C., and more preferably 220° C. to 300° C.

Molded Product and Uses

The thiourethane urea molded product according to the present invention is obtained from the polymerizable composition of the present invention, and can be obtained in various shapes by changing a mold during molding. The thiourethane urea molded product according to the present invention has high transparency, and can be used for various applications as an optical resin, such as a plastic lens, a camera lens, a light emitting diode (LED), a prism, an optical fiber, an information recording substrate, a filter, and a light emitting diode. In particular, the thiourethane urea molded product according to the present invention is suitable as an optical material or an optical element such as a plastic lens, a camera lens, a light emitting diode, or the like.

The plastic lens comprised of the thiourethane urea molded product of the present invention may be used with the formation of a coating layer over one side or both sides thereof, if desired. Examples of the coating layer include a primer layer, a hard coating layer, an anti-reflection layer, an anti-fog coating layer, an anti-fouling layer, and a water-repellent layer. These coating layers may be used alone or as a multilayered structure of plural coating layers. In the case where coating layers are formed over both sides of the plastic lens, the same or different coating layers may be formed over each side.

In each of these coating layers, an ultraviolet absorber for protecting a lens and an eye from ultraviolet rays; an infrared absorber for protecting an eye from infrared rays; a light stabilizer or an antioxidant for improving the weather resistance of the lens; a dye or a pigment for improving the fashionability of the lens; and a photochromic dye, a photochromic pigment, an anti-static agent, and other known additives for improving the performance of the lens may be used in a combination thereof. For a layer which is coated by application, various leveling agents for improving the coatability may be used.

Typically, the primer layer is formed between a hard coating layer described below and an optical lens. The primer layer is a coating layer for improving the adhesiveness between the hard coating layer and the lens which are formed thereon, and can improve impact resistance in some cases. The primer layer can be formed of any material as long as the material has high adhesiveness to the obtained optical lens. Typically, for example, a primer composition containing a urethane resin, an epoxy resin, a polyester resin, a melanin resin, or polyvinyl acetal as a main component is used. In the primer composition, an appropriate solvent which does not affect the lens may be used to adjust the viscosity of the composition. Of course, a solvent is not necessarily used.

The primer composition can be formed using any method such as a coating method or a dry method. In the case where the coating method is used, a primer layer is formed by coating the lens with the primer composition using a known coating method such as spin coating or dip coating and then solidifying the primer composition. In the case where the dry method is used, the primer layer is formed using a known dry method such as a CVD method or a vacuum deposition method. During the formation of the primer layer, in order to improve the adhesiveness, the surface of the lens may be optionally subjected to a pre-treatment such as an alkaline treatment, a plasma treatment, or an ultraviolet treatment.

The hard coating layer is a coating layer for imparting scratch resistance, abrasion resistance, moisture resistance, resistance to hot water, heat resistance, and weather resistance to the lens surface.

In general, the hard coating layer is formed of a hard coating composition containing an organic silicon compound having curability and one or more oxide fine particles of elements selected from the element group consisting of Si, Al, Sn, Sb, Ta, Ce, La, Fe, Zn, W, Zr, In and Ti and/or one or more fine particles of composite oxides which are formed of two or more elements selected from the above element group.

It is preferred that the hard coating composition further contains at least one of amines, amino acids, metal acetylacetonate complexes, organic acid metal salts, perchloric acids, salts of perchloric acids, acids, metal chlorides, and polyfunctional epoxy compounds, in addition to the above-described components. In the hard coating composition, an appropriate solvent which does not affect the lens may be used. Of course, a solvent is not necessarily used.

Typically, the hard coating layer is formed by coating the lens with the hard coating composition using a known coating method such as spin coating or dip coating and curing the hard coating composition. Examples of a curing method include a method of curing by thermal curing, or irradiation with energy beams such as ultraviolet rays or visible rays. In order to suppress the generation of interference fringes, the difference in refractive index between the hard coating layer and the lens is preferably within a range of ±0.1.

Typically, the anti-reflection layer is optionally formed on the hard coating layer. The anti-reflection layer is an inorganic or organic layer. In the case where the anti-reflection layer is an inorganic layer, this inorganic layer is formed of an inorganic oxide such as $SiO_2$ or $TiO_2$ using a dry method such as a vacuum deposition method, a sputtering method, an ion plating method, an ion beam assisted method, or a CVD method. In the case where the anti-reflection layer is an organic layer, this organic layer is formed of a composition containing an organic silicon compound and silica fine particles having internal cavities using a wet method.

The anti-reflection layer is composed of a single layer or multiple layers. In the case where the anti-reflection layer is a single layer, it is preferable that the refractive index is lower than that of the hard coating layer by at least 0.1 or more. In order to efficiently exhibit an anti-reflection function, it is preferable that the anti-reflection layer is a multilayered anti-reflection film. In this case, a low-refractive-index film and a high-refractive-index film are alternately laminated. In this case, the difference in refractive index between the low-refractive-index film and the high-refractive-index film is preferably 0.1 or more. Examples of the high-refractive-index film include films of ZnO, $TiO_2$, $CeO_2$, $Sb_2O_5$, $SnO_2$, $ZrO_2$, and $Ta_2O_5$. Examples of the low-refractive-index film include a $SiO_2$ film.

Optionally, an anti-fog coating layer, an anti-fouling layer, and a water-repellent layer may be formed over the anti-reflection layer. The method of forming an anti-fog coating layer, an anti-fouling layer or a water-repellent layer is not particularly limited in terms of the treatment method, the treatment material, and the like, as long as these factors do not bring adverse influence on the function of preventing reflection, and known anti-fog coating treatment method, anti-fouling treatment method, water repellent treatment method, and materials can be used. Examples of the anti-fog coating treatment method and the anti-fouling treatment method include a method of covering the surface with a surfactant, a method of adding a hydrophilic film to the surface to impart water absorbency thereto, a method of covering the surface with fine convex and concave portions to improve water absorbency, a method of imparting water absorbency to the surface using photocatalytic activities, and a method of performing a super water-repellent treatment on the surface to prevent attachment of water droplets thereon. In addition, examples of the water-repellent treatment method include a method of forming a water-repellent treatment layer by vapor deposition or sputtering of a fluorine-containing silane compound or the like; and a method of forming a water-repellent treatment layer by dissolving a fluorine-containing silane compound in a solvent and applying the solution.

The plastic lens using the thiourethane urea molded product according to the present invention, may be dyed with a dye according to the purpose in order to impart fashionability, photochromicity, and the like. The lens can be dyed using a known dyeing method but typically is dyed using the following method.

In a typical method, a lens material having a predetermined finished optical surface is dipped (dyeing step) in a dye solution in which a dye to be used is dissolved or is uniformly dispersed, and then the lens is optionally heated to fix the dye (post-dyeing annealing step). The dye used in the dyeing step is not particularly limited as long as it is a known dye. Typically, an oil-soluble dye or a disperse dye is used. A solvent used in the dyeing step is not particularly limited as long as the dye used is soluble or is uniformly dispersible therein. In this dyeing step, optionally a surfactant for dispersing the dye in the dye solution or a carrier for promoting dyeing may be added. In the dyeing step, the dye and the surfactant which is optionally added are dispersed in water or a mixture of water and an organic solvent to prepare a dye bath, and the optical lens is dipped in this dye bath to carry out dyeing of the lens at a predetermined temperature for a predetermined amount of time. The dyeing temperature and time vary depending on a desired coloration density. Typically, the dyeing is performed at 120° C. or lower for several minutes to several tens of hours at a dye concentration in the dye bath of 0.01 to 10 wt %. In addition, in the case where it is difficult to perform the dyeing, the dyeing is performed under pressure. The post-dyeing annealing step which is carried out according to necessity is a step of performing a heat treatment to the dyed lens material. The heat treatment is performed such that the water remaining on the surface of the lens material which has been dyed in the dyeing step, is removed using a solvent or the like, or the solvent is air-dried, and then the lens material is retained in a furnace such as an infrared heating furnace in an air atmosphere or a resistance heating furnace, for a predetermined time. The post-dyeing annealing step prevents fading of the dyed lens material (anti-fading treatment), and also removes moisture that has penetrated inside the lens material during dyeing.

In addition, eyeglass plastic lenses may be stored in a state of being packed for a relatively long period of time, and consequently there may be problems in quality. For example, during the storage of lenses, scratches, the shape thereof changes due to moisture absorption, or the colors of left and right lenses change and are different from each other due to a difference in the storage period of the lenses.

In this case, such problems may be solved and improved using known packaging techniques (for example, Japanese Laid-open Patent Publication No. 2007-99313, Japanese Laid-open Patent Publication No. 2007-24998, and Japanese Laid-open Patent Publication No. H09-216674).

Specific examples of the packaging techniques include a method of sealing and storing a lens in a packaging material which is formed of a material having properties (gas barrier properties) of suppressing permeation of oxygen or oxygen and water vapor and is filled with an inert gas; a method of sealing and storing a lens in a packaging material which is formed of a material having properties (gas barrier properties) of suppressing permeation of oxygen or oxygen and water vapor together with a deoxygenating agent; and a method of sealing a lens in a vacuum.

As the deoxygenating agent, a known one may be used, in which, for example, a deoxygenating agent composition which absorbs oxygen is packed in a packaging material having gas permeability. As the deoxygenating agent composition, for example, a composition which absorbs oxygen using an oxidation reaction of a reducing metal may be used. Examples of the deoxygenating agent using such a deoxygenating agent composition include a moisture-dependent deoxygenating agent in which replenishment of moisture from an atmosphere is required during deoxygenation; and a self-reacting deoxygenating agent in which replenishment of moisture from an atmosphere is not required. When the self-reacting deoxygenating agent is used, the deoxygenating agent is preferably packed in a packaging material together with a desiccant (for example, silica gel). In addition, a deoxygenating agent having a deoxygenating function and a drying function at the same time may be used (for example, PHARMAKEEP (KD and KC type) manufactured by MITSUBISHI GAS CHEMICAL COMPANY, INC.). In addition, a deoxygenating agent which exhibits a deoxygenating function in a dry atmosphere without the necessity of supplying a moisture donor may be used. Examples of such a deoxygenating agent include a deoxygenating agent including a deoxygenating component which is formed of a crosslinked polymer having an unsaturated carbon-carbon bond (for example, refer to Japanese Laid-open Patent Publication No. H11-70331); a deoxygenating agent including a metal, which is obtained by activating a transition metal supported on a carrier, as a major component (for example, refer to Japanese Laid-open Patent Publication No. H08-38883); a deoxygenating agent including activated magnesium, which is obtained by supporting a magnesium compound on a carrier and reducing the supported magnesium compound, as a major component (for example, refer to Japanese Laid-open Patent Publication No. 2001-37457); and a deoxygenating agent including an oxygen absorbing composition in which a substance including a liquid hydrocarbon oligomer having an unsaturated group as a major component and including an oxygen absorption accelerating material is supported on a carrier (for example, refer to Japanese Laid-open Patent Publication No. H10-113555). Examples of a commercially available product include PHARMAKEEP (KH type) manufactured by MITSUBISHI GAS CHEMICAL COMPANY, INC.

In addition, examples of the self-reacting deoxygenating agent include a deoxygenating agent disclosed in Japanese Examined Patent Publication No. S57-31449 in which a moisture donor is present such that moisture required for deoxygenation is supplied therefrom.

The filling of a packaging material with an inert gas and the sealing of a packaging material can be carried out by evacuating air from the packaging material and filling the packaging material with the inert gas so as to replace the air inside the packaging material with the inert gas and, in this state, sealing an opening of the packaging material.

As the inert gas filling the inside of the packaging material, for example, nitrogen, argon, helium, or neon, and the like can be used. From the viewpoint of economical efficiency, nitrogen gas is preferably used.

In order to prevent deterioration such as lens deformation caused by moisture and to remove moisture in air remaining in the packaging material, a desiccant (for example, silica gel) may be enclosed in the packaging material together with a lens.

Preferred examples of the packaging material include a material having a metal foil layer, such as aluminum having low oxygen permeability, which is formed of a material capable of suppressing permeation of at least oxygen.

EXAMPLES

Hereinafter, the present invention will be described in detail with reference to Examples.

In the performance test of resins, heat moldability, transparency, refractive index, Abbe number, water absorbency, chemical resistance, and surface deformation were evaluated by the following methods.

Heat moldability: In the case where a homogeneous liquid state was obtained without generation and foam formation of by-product gases when a resin was heated to a melting point thereof, and a molded product having transparency was obtained upon subsequent cooling, it was determined as "heat moldable". Anything belonging to other than the foregoing description was determined as "non-heat moldable."

Transparency: The obtained resin was irradiated with light using a projector in a dark place to determine whether or not fogging, or an opaque material was observed by visual inspection. A case where fogging, or an opaque material was not observed was evaluated as "O" (transparent), and a case where fogging, or an opaque material was observed was evaluated as "X" (not transparent).

Refractive index (ne), and Abbe number (ve): The measurement was performed using a Pulfrich refractometer at 20° C.

Water absorbency: In accordance with JIS K7209, a molded product was immersed in water for 7 days, and the percentage (%) of increase in weight of the molded product was measured.

Chemical resistance: A molded product was immersed in methanol for 30 seconds and the percentage (%) of increase in weight of the molded product was measured.

Surface deformation: A lens having 2 curves on a front surface, 6 curves on a back surface, and a center thickness of 1 mm was kept for one month under the conditions of temperature of 20° C. and humidity of 35%, and the presence or absence of deformation in the center plane was examined. A case where deformation was not observed was evaluated as "O" (no surface deformation) and a case where deformation was observed was evaluated as "X" (surface deformation occurred).

Example 1

53.4 parts by weight of a mixture of 2,5-bis(isocyanatomethyl)bicyclo[2.2.1]heptane and 2,6-bis(isocyanatomethyl)bicyclo[2.2.1]heptane, 0.03 parts by weight of dimethyl tin dichloride, 0.1 parts by weight of an internal mold release agent (manufactured by Mitsui Chemicals, Inc.; trade name: internal mold release agent for MR), and 1.5 parts by weight of an ultraviolet absorber (manufactured by KYODO CHEMICAL CO., LTD.; trade name: Biosorb 583) were mixed and dissolved to prepare a homogeneous solution. Into this solution, 31.9 parts by weight of bis(2-mercaptoethyl)sulfide, and 14.7 parts by weight of N,N'-di(1,2,2-trimethylpropyl)-1,6-hexamethylenediamine (manufactured by ALBEMARLE Corporation; trade name: ETHACURE 90) were mixed with high speed stirring in this order using a dynamic mixer type mixing-discharging device. The resulting polymerizable composition was warmed to 120° C. to obtain a resin, and then a pellet of a thiourethane urea resin was obtained by a pelletizer. The resulting pellet was dried at 80° C. for 2 hours, and melted by heating to 260° C. A plastic lens of a lens shape was obtained by an injection molding machine. The resulting plastic lens had transparency, a refractive index (ne) of 1.58, and an Abbe number (ve) of 41. Further, the resulting plastic lens exhibited water absorbency of 0.25%, chemical resistance of 0.06%, and no surface deformation. The results are shown in Table-1.

Example 2

54.7 parts by weight of a mixture of 2,5-bis(isocyanatomethyl)bicyclo[2.2.1]heptane and 2,6-bis(isocyanatomethyl)bicyclo[2.2.1]heptane, 0.03 parts by weight of dimethyl tin dichloride, 0.1 parts by weight of an internal mold release agent (manufactured by Mitsui Chemicals, Inc.; trade name: internal mold release agent for MR), and 1.5 parts by weight of an ultraviolet absorber (manufactured by KYODO CHEMICAL CO., LTD.; trade name: Biosorb 583) were mixed and dissolved to prepare a homogeneous solution. Into this solution, 36.8 parts by weight of bis(2-mercaptoethyl)sulfide, and 8.5 parts by weight of N,N'-di-sec-butyl-4,4'-methylene-bis(cyclohexylamine) (manufactured by Dorf Ketal Speciality Catalysts, LLC.; trade name: CLEARLINK 1000) were mixed with high speed stirring in this order using a dynamic mixer type mixing-discharging device. The resulting polymerizable composition was warmed to 120° C. to obtain a resin, and then a pellet of a thiourethane urea resin was obtained by a pelletizer. The resulting pellet was dried at 80° C. for 2 hours, and melted by heating to 250° C. A plastic lens of a lens shape was obtained by an injection molding machine. The resulting plastic lens had transparency, a refractive index (ne) of 1.60, and an Abbe number (ve) of 40. Further, the resulting plastic lens exhibited water absorbency of 0.22%, chemical resistance of 0.01%, and no surface deformation. The results are shown in Table-1.

Example 3

55.6 parts by weight of a mixture of 2,5-bis(isocyanatomethyl)bicyclo[2.2.1]heptane and 2,6-bis(isocyanatomethyl)bicyclo[2.2.1]heptane, 0.03 parts by weight of dimethyl tin dichloride, 0.1 parts by weight of an internal mold release agent (manufactured by Mitsui Chemicals, Inc.; trade name: internal mold release agent for MR), and 1.5 parts by weight of an ultraviolet absorber (manufactured by KYODO CHEMICAL CO., LTD.; trade name: Biosorb 583) were mixed and dissolved to prepare a homogeneous solution. Into this solution, 37.5 parts by weight of bis(2-mercaptoethyl)sulfide, and 6.9 parts by weight of N,N'-di-isopropyl-isophorone diamine (manufactured by HUNTSMAN International LLC.; trade name: JEFFLINK 754) were mixed with high speed stirring in this order using a dynamic mixer type mixing-discharging device. The resulting polymerizable composition was warmed to 120° C. to obtain a resin, and then a pellet of a thiourethane urea resin was obtained by a pelletizer. The resulting pellet was dried at 80° C. for 2 hours, and melted by heating to 250° C. A plastic lens of a lens shape was obtained by an injection molding machine. The resulting plastic lens had transparency, a refractive index (ne) of 1.60, and an Abbe number (ve) of 40. Further, the resulting plastic lens exhibited water absorbency of 0.22%, chemical resistance of 0%, and no surface deformation. The results are shown in Table-1.

Example 4

49.3 parts by weight of m-xylylene diisocyanate, 0.01 parts by weight of dimethyl tin dichloride, 0.1 parts by weight of an internal mold release agent (manufactured by Mitsui Chemicals, Inc.; trade name: internal mold release agent for MR), and 1.5 parts by weight of an ultraviolet absorber (manufactured by KYODO CHEMICAL CO., LTD.; trade name: Biosorb 583) were mixed and dissolved to prepare a homogeneous solution. Into this solution, 28.3 parts by weight of bis(2-mercaptoethyl)sulfide, and 22.4 parts by weight of N,N'-di(1,2,2-trimethylpropyl)-1,6-hexamethylenediamine (manufactured by ALBEMARLE Corporation; trade name: ETHACURE 90) were mixed with high speed stirring in this order using a dynamic mixer type mixing-discharging device. The resulting polymerizable composition was warmed to 120° C. to obtain a resin, and then a pellet of a thiourethane urea resin was obtained by a pelletizer. The resulting pellet was dried at 80° C. for 2 hours, and melted by heating to 280° C. A plastic lens of a lens shape was obtained by an injection molding machine. The resulting plastic lens had transparency, a refractive index (ne) of 1.60, and an Abbe number (ve) of 35. Further, the resulting plastic lens exhibited water absorbency of 0.26%, chemical resistance of 0.23%, and no surface deformation. The results are shown in Table-1.

Example 5

47.9 parts by weight of m-xylylene diisocyanate, 0.01 parts by weight of dimethyl tin dichloride, 0.1 parts by weight of an internal mold release agent (manufactured by Mitsui Chemicals, Inc.; trade name: internal mold release agent for MR), and 1.5 parts by weight of an ultraviolet absorber (manufactured by KYODO CHEMICAL CO., LTD.; trade name: Biosorb 583) were mixed and dissolved to prepare a homogeneous solution. Into this solution, 19.7 parts by weight of bis(2-mercaptoethyl)sulfide, and 32.4 parts by weight of N,N'-di-isopropyl-isophorone diamine (manufactured by HUNTSMAN International LLC.; trade name: JEFFLINK 754) were mixed with high speed stirring in this order using a dynamic mixer type mixing-discharging device. The resulting polymerizable composition was warmed to 120° C. to obtain a resin, and then a pellet of a thiourethane urea resin was obtained by a pelletizer. The resulting pellet was dried at 80° C. for 2 hours, and melted by heating to 280° C. A plastic lens of a lens shape was obtained by an injection molding machine. The resulting plastic lens had transparency, a refractive index (ne) of 1.60, and an Abbe number (ve) of 36. Further, the resulting plastic lens exhibited water absorbency of 0.21% and chemical resistance of 0.20%. The results are shown in Table-1.

Example 6

42.7 parts by weight of m-xylylene diisocyanate, 0.01 parts by weight of dimethyl tin dichloride, 0.1 parts by weight of an internal mold release agent (manufactured by Mitsui Chemicals, Inc.; trade name: internal mold release agent for MR), and 1.5 parts by weight of an ultraviolet absorber (manufactured by KYODO CHEMICAL CO., LTD.; trade name: Biosorb 583) were mixed and dissolved to prepare a homogeneous solution. Into this solution, 37.9 parts by weight of ethylene glycol bis(3-mercaptopropionate), and 19.4 parts by weight of N,N'-di(1,2,2-trimethylpropyl)-1,6-hexamethylenediamine (manufactured by ALBEMARLE Corporation; trade name: ETHACURE 90) were mixed with high speed stirring in this order using a dynamic mixer type mixing-discharging device. The resulting polymerizable composition was warmed to 120° C. to obtain a resin, and a pellet of a thiourethane urea resin was obtained by a pelletizer. The resulting pellet was dried at 80° C. for 2 hours, and melted by heating to 290° C. A plastic lens of a lens shape was obtained by an injection molding machine. The resulting plastic lens had transparency, a refractive index (ne) of 1.57, and an Abbe number (ve) of 38. Further, the resulting plastic lens exhibited water absorbency of 0.30% and chemical resistance of 0.26%. The results are shown in Table-1.

Example 7

56.2 parts by weight of 4,4'-methylene-bis(cyclohexyl isocyanate), 0.20 parts by weight of dimethyl tin dichloride, 0.1 parts by weight of an internal mold release agent (manufactured by Mitsui Chemicals, Inc.; trade name: internal mold release agent for MR), and 1.5 parts by weight of an ultraviolet absorber (manufactured by KYODO CHEMICAL CO., LTD.; trade name: Biosorb 583) were mixed and dissolved to prepare a homogeneous solution. Into this solution, 16.5 parts by weight of bis(2-mercaptoethyl)sulfide, and 27.3 parts by weight of N,N'-di-isopropyl-isophorone diamine (manufactured by HUNTSMAN International LLC.; trade name: JEFFLINK 754) were mixed with high speed stirring in this order using a dynamic mixer type mixing-discharging device. The resulting polymerizable composition was warmed to 120° C. to obtain a resin, and then a pellet of a thiourethane urea resin was obtained by a pelletizer. The resulting pellet was dried at 80° C. for 2 hours, and melted by heating to 270° C. A plastic lens of a lens shape was obtained by an injection molding machine. The resulting plastic lens had transparency, a refractive index (ne) of 1.55, and an Abbe number (ve) of 42. Further, the resulting plastic lens exhibited water absorbency of 0.21%, chemical resistance of 0.18%, and no surface deformation. The results are shown in Table-1.

Example 8

50.1 parts by weight of 4,4'-methylene-bis(cyclohexyl isocyanate), 0.20 parts by weight of dimethyl tin dichloride, 0.1 parts by weight of an internal mold release agent (manufactured by Mitsui Chemicals, Inc.; trade name: internal mold release agent for MR), and 1.5 parts by weight of an ultraviolet absorber (manufactured by KYODO CHEMICAL CO., LTD.; trade name: Biosorb 583) were mixed and dissolved to prepare a homogeneous solution. Into this solution, 22.7 parts by weight of ethylene glycol bis(3-mercaptopropionate), and 27.2 parts by weight of N,N'-di(1,2,2-trimethylpropyl)-1,6-hexamethylenediamine (manufactured by ALBEMARLE Corporation; trade name: ETHACURE 90) were mixed with high speed stirring in this order using a dynamic mixer type mixing-discharging device. The resulting polymerizable composition was warmed to 120° C. to obtain a resin, and then a pellet of a thiourethane urea resin was obtained by pelletizer. The resulting pellet was dried at 80° C. for 2 hours, and melted by heating to 260° C. A plastic lens of a lens shape was obtained by an injection molding machine. The resulting plastic lens had transparency, a refractive index (ne) of 1.53, and an Abbe number (ve) of 47. Further, the resulting plastic lens exhibited water absorbency of 0.32% and chemical resistance of 0.26%. The results are shown in Table-1.

Example 9

48.3 parts by weight of 4,4'-methylene-bis(cyclohexyl isocyanate), 0.20 parts by weight of dimethyl tin dichloride, 0.1 parts by weight of an internal mold release agent (manufactured by Mitsui Chemicals, Inc.; trade name: internal mold release agent for MR), and 1.5 parts by weight of an ultraviolet absorber (manufactured by KYODO CHEMICAL CO., LTD.; trade name: Biosorb 583) were mixed and dissolved to prepare a homogeneous solution. Into this solution, 22.0 parts by weight of ethylene glycol bis(3-mercaptopropionate), and 29.7 parts by weight of N,N'-di-sec-butyl-4,4'-methylene-bis(cyclohexylamine) (manufactured by Dorf Ketal Speciality Catalysts, LLC.; trade name: CLEARLINK 1000) were mixed with high speed stirring in this order using a dynamic mixer type mixing-discharging device. The resulting polymerizable composition was warmed to 120° C. to obtain a resin, and then a pellet of a thiourethane urea resin was obtained by a pelletizer. The resulting pellet was dried at 80° C. for 2 hours, and melted by heating to 250° C. A plastic lens of a lens shape was obtained by an injection molding machine. The resulting plastic lens had transparency, a refractive index (ne) of 1.53, and an Abbe number (ve) of 50. Further, the resulting plastic lens exhibited water absorbency of 0.29% and chemical resistance of 0.15%. The results are shown in Table-1.

Example 10

51.6 parts by weight of 4,4'-methylene-bis(cyclohexyl isocyanate), 0.20 parts by weight of dimethyl tin dichloride, 0.1 parts by weight of an internal mold release agent (manufactured by Mitsui Chemicals, Inc.; trade name: internal mold release agent for MR), and 1.5 parts by weight of an ultraviolet absorber (manufactured by KYODO CHEMICAL CO., LTD.; trade name: Biosorb 583) were mixed and dissolved to prepare a homogeneous solution. Into this solution, 23.4 parts by weight of ethylene glycol bis(3-mercaptopropionate), and 25.0 parts by weight of N,N'-di-isopropyl-isophorone diamine (manufactured by HUNTSMAN International LLC.; trade name: JEFFLINK 754) were mixed with high speed stirring in this order using a dynamic mixer type mixing-discharging device. The resulting polymerizable composition was warmed to 120° C. to obtain a resin, and then a pellet of a thiourethane urea resin was obtained by a pelletizer. The resulting pellet was dried at 80° C. for 2 hours, and melted by heating to 270° C. A plastic lens of a lens shape was obtained by an injection molding machine. The resulting plastic lens had transparency, a refractive index (ne) of 1.52, and an Abbe number (ve) of 48. Further, the resulting plastic lens exhibited water absorbency of 0.29% and chemical resistance of 0.15%. The results are shown in Table-1.

Example 11

54.2 parts by weight of 1,3-bis(isocyanatomethyl)cyclohexane, 0.03 parts by weight of dimethyl tin dichloride, 0.1 parts by weight of an internal mold release agent (manufactured by Mitsui Chemicals, Inc.; trade name: internal mold release agent for MR), and 1.5 parts by weight of an ultraviolet absorber (manufactured by KYODO CHEMICAL CO., LTD.; trade name: Biosorb 583) were mixed and dissolved to prepare a homogeneous solution. Into this solution, 38.7 parts by weight of bis(2-mercaptoethyl)sulfide, and 7.1 parts by weight of N,N'-di-isopropyl-isophorone diamine (manufactured by HUNTSMAN International LLC.; trade name: JEFFLINK 754) were mixed with high speed stirring in this order using a dynamic mixer type mixing-discharging device. The resulting polymerizable composition was warmed to 120° C. to obtain a resin, and then a pellet of a thiourethane urea resin was obtained by a pelletizer. The resulting pellet was dried at 80° C. for 2 hours, and was melted by heating to 260° C. A plastic lens or a lens shape was obtained by an injection molding machine. The resulting plastic lens had transparency, a refractive index (ne) of 1.60, and an Abbe number (ve) of 40. Further, the resulting plastic lens exhibited water absorbency of 0.20% and chemical resistance of 0.02%. The results are shown in Table-1.

Example 12

54.2 parts by weight of 1,4-bis(isocyanatomethyl)cyclohexane, 0.03 parts by weight of dimethyl tin dichloride, 0.1 parts by weight of an internal mold release agent (manufactured by Mitsui Chemicals, Inc.; trade name: internal mold release agent for MR), and 1.5 parts by weight of an ultraviolet absorber (manufactured by KYODO CHEMICAL CO., LTD.; trade name: Biosorb 583) were mixed and dissolved to prepare a homogeneous solution. Into this solution, 3.87 parts by weight of bis(2-mercaptoethyl)sulfide, and 7.1 parts by weight of N,N'-di-isopropyl-isophorone diamine (manufactured by HUNTSMAN International LLC.; trade name: JEFFLINK 754) were mixed with high speed stirring in this order using a dynamic mixer type mixing-discharging device. The resulting polymerizable composition was warmed to 120° C. to obtain a resin, and then a pellet of a thiourethane urea resin was obtained by a pelletizer. The resulting pellet was dried at 80° C. for 2 hours, and melted by heating to 260° C. A plastic lens of a lens shape was obtained by an injection molding machine. The resulting plastic lens had transparency, a refractive index (ne) of 1.60, and an Abbe number (ve) of 40. Further, the resulting plastic lens exhibited water absorbency of 0.21% and chemical resistance of 0.02%. The results are shown in Table-1.

Example 13

56.0 parts by weight of a mixture of 2,5-bis(isocyanatomethyl)bicyclo[2.2.1]heptane and 2,6-bis(isocyanatomethyl)bicyclo[2.2.1]heptane, 0.03 parts by weight of dimethyl tin dichloride, 0.1 parts by weight of an internal mold release agent (manufactured by Mitsui Chemicals, Inc.; trade name: internal mold release agent for MR), and 1.5 parts by weight of an ultraviolet absorber (manufactured by KYODO CHEMICAL CO., LTD.; trade name: Biosorb 583) were mixed and dissolved to prepare a homogeneous solution. Into this solution, 30.1 parts by weight of bis(2-mercaptoethyl)sulfide, and 13.9 parts by weight of N,N'-di(1,2,2-trimethylpropyl)-1,6-hexamethylenediamine (manufactured by ALBEMARLE Corporation; trade name: ETHACURE 90) were mixed with high speed stirring in this order using a dynamic mixer type mixing-discharging device. The resulting polymerizable composition was warmed to 120° C. to obtain a resin, and a pellet of a thiourethane urea resin was obtained by a pelletizer. The resulting pellet was dried at 80° C. for 2 hours, and melted by heating to 260° C. A plastic lens of a lens shape was obtained by an injection molding machine. The resulting plastic lens had transparency, a refractive index (ne) of 1.58, and an Abbe number (ve) of 41. Further, the resulting plastic lens exhibited water absorbency of 0.25%, chemical resistance of 0.05%, and no surface deformation. The results are shown in Table-1.

Example 14

51.0 parts by weight of a mixture of 2,5-bis(isocyanatomethyl)bicyclo[2.2.1]heptane and 2,6-bis(isocyanatomethyl)bicyclo[2.2.1]heptane, 0.03 parts by weight of dimethyl tin dichloride, 0.1 parts by weight of an internal mold release agent (manufactured by Mitsui Chemicals, Inc.; trade name: internal mold release agent for MR), and 1.5 parts by weight of an ultraviolet absorber (manufactured by KYODO CHEMICAL CO., LTD.; trade name: Biosorb 583) were mixed and dissolved to prepare a homogeneous solution. Into this solution, 33.5 parts by weight of bis(2-mercaptoethyl)sulfide, and 15.5 parts by weight of N,N'-di(1,2,2-trimethylpropyl)-1,6-hexamethylenediamine (manufactured by ALBEMARLE Corporation; trade name: ETHACURE 90) were mixed with high speed stirring in this order using a dynamic mixer type mixing-discharging device. The resulting polymerizable composition was warmed to 120° C. to obtain a resin, and then a pellet of a thiourethane urea resin was obtained by a pelletizer. The resulting pellet was dried at 80° C. for 2 hours, and melted by heating to 260° C. A plastic lens of a lens shape was obtained by an injection molding machine. The resulting plastic lens had transparency, a refractive index (ne) of 1.59, and an Abbe number (ve) of 41. Further, the resulting plastic lens exhibited water absorbency of 0.27%, chemical resistance of 0.08%, and no surface deformation. The results are shown in Table-1.

Comparative Example 1

56.4 parts by weight of a mixture of 2,5-bis(isocyanatomethyl)bicyclo[2.2.1]heptane and 2,6-bis(isocyanatomethyl)bicyclo[2.2.1]heptane, 0.03 parts by weight of dimethyl tin dichloride, 0.1 parts by weight of an internal mold release agent (manufactured by Mitsui Chemicals, Inc.; trade name: internal mold release agent for MR), and 1.5 parts by weight of an ultraviolet absorber (manufactured by KYODO CHEMICAL CO., LTD.; trade name: Biosorb 583) were mixed and dissolved to prepare a homogeneous solution. Into this solution, 33.8 parts by weight of bis(2-mercaptoethyl)sulfide, and 9.8 parts by weight of a mixture of 2,4-diamino-3,5-diethyl toluene and 2,6-diamino-3,5-diethyl toluene (manufactured by ALBEMARLE Corporation; trade name: ETHACURE 100) were mixed with high speed stirring in this order using a dynamic mixer type mixing-discharging device. The resulting polymerizable composition was warmed to 120° C. to obtain a thiourethane urea resin. The resulting resin was tested by heating and melting. When the temperature was gradually raised from room temperature, it was confirmed that generation of gas was partially observed from about 270° C., and the resin exhibited foam formation. Even when heated to 300° C., the resin exhibited no transparent melting while it was foamed white. Therefore, it was not possible to handle the obtained resin as a thermoplastic resin. The results are shown in Table-1.

Comparative Example 2

55.8 parts by weight of 4,4'-methylene-bis(cyclohexyl isocyanate), 0.20 parts by weight of dimethyl tin dichloride, 0.1 parts by weight of an internal mold release agent (manufactured by Mitsui Chemicals, Inc.; trade name: internal mold release agent for MR), and 1.5 parts by weight of an ultraviolet absorber (manufactured by KYODO CHEMICAL CO., LTD.; trade name: Biosorb 583) were mixed and dissolved to prepare a homogeneous solution. Into this solution, 25.3 parts by weight of ethylene glycol bis(3-mercaptopropionate), and 18.9 parts by weight of a mixture of 2,4-diamino-3,5-diethyl toluene and 2,6-diamino-3,5-diethyl toluene (manufactured by ALBEMARLE Corporation; trade name: ETHACURE 100) were mixed with high speed stirring in this order using a dynamic mixer type mixing-discharging device. The resulting polymerizable composition was warmed to 120° C. to obtain a thiourethane urea resin. The resulting resin was tested by heating and melting. When the temperature was gradually raised from room temperature, it was confirmed that generation of gas was partially observed from about 270° C., and the resin exhibited foam formation. Even when heated to 300° C., the resin exhibited no transparent melting while it was foamed white. Therefore, it was not possible to handle the obtained resin as a thermoplastic resin. The results are shown in Table-1.

Comparative Example 3

55.7 parts by weight of a mixture of 2,5-bis(isocyanatomethyl)bicyclo[2.2.1]heptane and 2,6-bis(isocyanatomethyl)bicyclo[2.2.1]heptane, 0.03 parts by weight of dimethyl tin dichloride, 0.1 parts by weight of an internal mold release agent (manufactured by Mitsui Chemicals, Inc.; trade name: internal mold release agent for MR), and 1.5 parts by weight of an ultraviolet absorber (manufactured by KYODO CHEMICAL CO., LTD.; trade name: Biosorb 583) were mixed and dissolved to prepare a homogeneous solution. Into this solution, 29.0 parts by weight of dipropylene glycol, and 15.3 parts by weight of N,N'-di(1,2,2-trimethylpropyl)-1,6-hexamethylenediamine (manufactured by ALBEMARLE Corporation; trade name: ETHACURE 90) were mixed with high speed stirring in this order using a dynamic mixer type mixing-discharging device. The resulting polymerizable composition was warmed to 120° C. to obtain a resin, and then a pellet of a thiourethane urea resin was obtained by a pelletizer. The resulting pellet was dried at 80° C. for 2 hours, and melted by heating to 260° C. A plastic lens of a lens shape was obtained by an injection molding machine. The resulting plastic lens had transparency, a refractive index (ne) of 1.51, and an Abbe number (ve) of 51. Further, the resulting plastic lens exhibited water absorbency of 0.61%, chemical resistance of 2.30%, and surface deformation. The results are shown in Table-1.

Comparative Example 4

57.4 parts by weight of a mixture of 2,5-bis(isocyanatomethyl)bicyclo[2.2.1]heptane and 2,6-bis(isocyanatomethyl)bicyclo[2.2.1]heptane, 0.03 parts by weight of dimethyl tin dichloride, 0.1 parts by weight of an internal mold release agent (manufactured by Mitsui Chemicals, Inc.; trade name: internal mold release agent for MR), and 1.5 parts by weight of an ultraviolet absorber (manufactured by KYODO CHEMICAL CO., LTD.; trade name: Biosorb 583) were mixed and dissolved to prepare a homogeneous solution. Into this solution, 33.6 parts by weight of dipropylene glycol, and 9.0 parts by weight of N,N'-di-sec-butyl-4,4'-methylene-bis(cyclohexylamine) (manufactured by Dorf Ketal Speciality Catalysts, LLC.; trade name: CLEARLINK 1000) were mixed with high speed stirring in this order using a dynamic mixer type mixing-discharging device. The resulting polymerizable composition was warmed to 120° C. to obtain a resin, and then a pellet of a thiourethane urea resin was obtained by a pelletizer. The resulting pellet was dried at 80° C. for 2 hours, and melted by heating to 260° C. A plastic lens of a lens shape was obtained by an injection molding machine. The resulting plastic lens had transparency, a refractive index (ne) of 1.51, and an Abbe number (ve) of 50. Further, the resulting plastic lens exhibited water absorbency of 0.67%, chemical, resistance of 2.80%, and surface deformation. The results are shown in Table-1.

Comparative Example 5

58.8 parts by weight of a mixture of 2,5-bis(isocyanatomethyl)bicyclo[2.2.1]heptane and 2,6-bis(isocyanatomethyl)bicyclo[2.2.1]heptane, 0.03 parts by weight of dimethyl tin dichloride, 0.1 parts by weight of an internal mold release agent (manufactured by Mitsui Chemicals, Inc.; trade name: internal mold release agent for MR), and 1.5 parts by weight of an ultraviolet absorber (manufactured by KYODO CHEMICAL CO., LTD.; trade name: Biosorb 583) were mixed and dissolved to prepare a homogeneous solution. Into this solution, 28.2 parts by weight of bis(2-mercaptoethyl)sulfide, and 13.0 parts by weight of N,N'-di(1,2,2-trimethylpropyl)-1,6-hexamethylenediamine (manufactured by ALBEMARLE Corporation; trade name: ETHACURE 90) were mixed with high speed stirring in this order using a dynamic mixer type mixing-discharging device. The resulting polymerizable composition was warmed to 120° C. to obtain a thiourethane urea resin. The resulting resin was tested by heating and melting. When the temperature was gradually raised from room temperature, it was confirmed that generation of gas was partially observed from about 260° C., and the resin exhibited foam formation. Even when heated to 300° C., the resin exhibited no transparent melting while it was foamed white. Therefore, it was not possible to handle the obtained resin as a thermoplastic resin. The results are shown in Table-1.

Comparative Example 6

48.8 parts by weight of a mixture of 2,5-bis(isocyanatomethyl)bicyclo[2.2.1]heptane and 2,6-bis(isocyanatomethyl)bicyclo[2.2.1]heptane, 0.03 parts by weight of dimethyl tin dichloride, 0.1 parts by weight of an internal mold release agent (manufactured by Mitsui Chemicals, Inc.; trade name: internal mold release agent for MR), and 1.5 parts by weight of an ultraviolet absorber (manufactured by KYODO CHEMICAL CO., LTD.; trade name: Biosorb 583) were mixed and dissolved to prepare a homogeneous solution. Into this solution, 35.0 parts by weight of bis(2-mercaptoethyl)sulfide, and 16.2 parts by weight of N,N'-di(1,2,2-trimethylpropyl)-1,6-hexamethylenediamine (manufactured by ALBEMARLE Corporation; ETHACURE 90) were mixed with high speed stirring in this order using a dynamic mixer type mixing-discharging device. The resulting polymerizable composition was warmed to 120° C. to obtain a thiourethane urea resin. The resulting resin was tested by heating and melting. When the temperature was gradually raised from room temperature, it was confirmed that generation of volatile components was observed from about 260° C. The volatile components thus generated were estimated to be unreacted monomers, and therefore it was determined that the formation of such volatile components was not allowable in terms of safety, correspondingly the molding was discontinued. Consequently, it was not possible to handle the obtained resin as a thermoplastic resin. The results are shown in Table-1.

Comparative Example 7

45.7 parts by weight of a mixture of 2,5-bis(isocyanatomethyl)bicyclo[2.2.1]heptane and 2,6-bis(isocyanatomethyl)bicyclo[2.2.1]heptane, 0.03 parts by weight of dimethyl tin dichloride, 0.1 parts by weight of an internal mold release agent (manufactured by Mitsui Chemicals, Inc.; trade name: internal mold release agent for MR), and 1.5 parts by weight of an ultraviolet absorber (manufactured by KYODO CHEMICAL CO., LTD.; trade name: Biosorb 583) were mixed and dissolved to prepare a homogeneous solution. Into this solution, 10.2 parts by weight of bis(2-mercaptoethyl)sulfide, and 44.1 parts by weight of N,N'-di(1,2,2-trimethylpropyl)-1,6-hexamethylenediamine (manufactured by ALBEMARLE Corporation; trade name: ETHACURE 90) were mixed with high speed stirring in this order using a dynamic mixer type mixing-discharging device. The resulting polymerizable composition was warmed to 120° C. to obtain a resin, and then a pellet of a thiourethane urea resin was obtained by a pelletizer. The resulting pellet was dried at 80° C. for 2 hours, and melted by heating to 260° C. A plastic lens of a lens shape was obtained by an injection molding machine. The resulting plastic lens had transparency, a refractive index (ne) of 1.52, and an Abbe number (ve) of 49, and exhibited surface deformation. The results are shown in Table-1.

TABLE 1

| Example No. | Amine | Thiol | Isocyanate | *1 | *2 | Heat molding Moldability (Molding temperature) | Transparency | Optical properties Refractive index (ne) | Abbe number (ve) | Water absorbency (%) | Chemical resistance (%) | Surface deformation |
|---|---|---|---|---|---|---|---|---|---|---|---|---|
| Example 1 | a-1 (14.7 parts by weight) | t-1 (31.9 parts by weight) | i-1 (53.4 parts by weight) | 1.00 | 0.20 | Moldable (260° C.) | ○ | 1.58 | 41 | 0.25 | 0.06 | ○ |
| Example 2 | a-2 (8.5 parts by weight) | t-1 (36.8 parts by weight) | i-1 (54.7 parts by weight) | 1.00 | 0.10 | Moldable (250° C.) | ○ | 1.60 | 40 | 0.22 | 0.01 | ○ |
| Example 3 | a-3 (6.9 parts by weight) | t-1 (37.5 parts by weight) | i-1 (55.6 parts by weight) | 1.00 | 0.10 | Moldable (250° C.) | ○ | 1.60 | 40 | 0.22 | 0.00 | ○ |
| Example 4 | a-1 (22.4 parts by weight) | t-1 (28.3 parts by weight) | i-2 (49.3 parts by weight) | 1.00 | 0.30 | Moldable (280° C.) | ○ | 1.60 | 35 | 0.26 | 0.23 | ○ |

TABLE 1-continued

| Example No. | Amine | Thiol | Isocyanate | *1 | *2 | Heat molding Moldability (Molding temperature) | Transparency | Refractive index (ne) | Abbe number (ve) | Water absorbency (%) | Chemical resistance (%) | Surface deformation |
|---|---|---|---|---|---|---|---|---|---|---|---|---|
| Example 5 | a-3 (32.4 parts by weight) | t-1 (19.7 parts by weight) | i-2 (47.9 parts by weight) | 1.00 | 0.50 | Moldable (280° C.) | ○ | 1.60 | 36 | 0.21 | 0.20 | — |
| Example 6 | a-1 (19.4 parts by weight) | t-2 (37.9 parts by weight) | i-2 (42.7 parts by weight) | 1.00 | 0.30 | Moldable (290° C.) | ○ | 1.57 | 38 | 0.30 | 0.26 | — |
| Example 7 | a-3 (27.3 parts by weight) | t-1 (16.5 parts by weight) | i-3 (56.2 parts by weight) | 1.00 | 0.50 | Moldable (270° C.) | ○ | 1.55 | 42 | 0.21 | 0.18 | ○ |
| Example 8 | a-1 (27.2 parts by weight) | t-2 (22.7 parts by weight) | i-3 (50.1 parts by weight) | 1.00 | 0.50 | Moldable (260° C.) | ○ | 1.53 | 47 | 0.32 | 0.26 | — |
| Example 9 | a-2 (29.7 parts by weight) | t-2 (22.0 parts by weight) | i-3 (48.3 parts by weight) | 1.00 | 0.50 | Moldable (250° C.) | ○ | 1.53 | 50 | 0.29 | 0.15 | — |
| Example 10 | a-3 (25.0 parts by weight) | t-2 (23.4 parts by weight) | i-3 (51.6 parts by weight) | 1.00 | 0.50 | Moldable (270° C.) | ○ | 1.52 | 48 | 0.29 | 0.15 | — |
| Example 11 | a-3 (7.1 parts by weight) | t-1 (38.7 parts by weight) | i-4 (54.2 parts by weight) | 1.00 | 0.10 | Moldable (260° C.) | ○ | 1.60 | 40 | 0.20 | 0.02 | — |
| Example 12 | a-3 (7.1 parts by weight) | t-1 (38.7 parts by weight) | i-5 (54.2 parts by weight) | 1.00 | 0.10 | Moldable (260° C.) | ○ | 1.60 | 40 | 0.21 | 0.02 | — |
| Example 13 | a-1 (13.9 parts by weight) | t-1 (30.1 parts by weight) | i-1 (56.0 parts by weight) | 0.90 | 0.20 | Moldable (260° C.) | ○ | 1.58 | 41 | 0.25 | 0.05 | ○ |
| Example 14 | a-1 (15.5 parts by weight) | t-1 (33.5 parts by weight) | i-1 (51.0 parts by weight) | 1.10 | 0.20 | Moldable (260° C.) | ○ | 1.59 | 41 | 0.21 | 0.02 | ○ |
| Comparative Example 1 | a-4 (9.8 parts by weight) | t-1 (33.8 parts by weight) | i-1 (56.4 parts by weight) | 1.00 | 0.20 | Non-moldable | X | — | — | — | — | — |
| Comparative Example 2 | a-4 (18.9 parts by weight) | t-2 (25.3 parts by weight) | i-3 (55.8 parts by weight) | 1.00 | 0.50 | Non-moldable | X | — | — | — | — | — |
| Comparative Example 3 | a-1 (15.3 parts by weight) | t-3 (29.0 parts by weight) | i-1 (55.7 parts by weight) | 1.00 | 0.20 | Moldable (260° C.) | ○ | 1.51 | 51 | 0.61 | 2.30 | X |
| Comparative Example 4 | a-2 (9.0 parts by weight) | t-3 (33.6 parts by weight) | i-1 (57.4 parts by weight) | 1.00 | 0.10 | Moldable (260° C.) | ○ | 1.51 | 50 | 0.67 | 2.80 | X |
| Comparative Example 5 | a-1 (13.0 parts by weight) | t-1 (28.2 parts by weight) | i-1 (58.8 parts by weight) | 0.80 | 0.20 | Non-moldable | X | — | — | — | — | — |
| Comparative Example 6 | a-1 (16.2 parts by weight) | t-1 (35.0 parts by weight) | i-1 (48.8 parts by weight) | 1.20 | 0.20 | Non-moldable | — | — | — | — | — | — |
| Comparative Example 7 | a-1 (44.1 parts by weight) | t-1 (10.2 parts by weight) | i-1 (45.7 parts by weight) | 1.00 | 0.70 | Moldable (260° C.) | ○ | 1.52 | 49 | — | — | X |

*1: The ratio ((a + b)/c) of the total molar number (a + b) of the molar number a of amino groups in the amine (A) and the molar number b of mercapto groups in the thiol (B) with respect to the molar number c of isocyanato groups in the isocyanate (C)
*2: The ratio (a/c) of the molar number a of amino groups in the amine (A) with respect to the molar number c of isocyanato groups in the isocyanate (C)
a-1: N,N'-di(1,2,2-trimethylpropyl)-1,6-hexamethylenediamine (manufactured by ALBEMARLE Corporation; trade name: ETHACURE 90)
a-2: N,N'-Di-sec-butyl-4,4'-methylene-bis(cyclohexylamine) (manufactured by Dorf Ketal Speciality Catalysts, LLC,; trade name: CLEARLINK 1000)
a-3: N,N'-di-isopropyl-isophorone diamine (manufactured by HUNTSMAN International LLC.; trade name: JEFFLINK 754)
a-4: Mixture of 2,4-diamino-3,5-diethyl toluene and 2,6-diamino-3,5-diethyl toluene (manufactured by ALBEMARLE Corporation; trade name: ETHACURE 100)
t-1: Bis(2-mercaptoethyl)sulfide
t-2: Ethylene glycol bis(3-mercaptopropionate)
t-3: Dipropylene glycol
i-1: Mixture of 2,5-bis(isocyanatomethyl)-bicyclo[2.2.1]heptane and 2,6-bis(isocyanatomethyl)-bicyclo[2.2.1]heptane
i-2: m-Xylyene diisocyanate
i-3: 4,4'-Methylene-bis(cyclohexyl isocyanate)
i-4: 1,3-Bis(isocyanatomethyl)cyclohexane
i-5: 1,4-Bis(isocyanatomethyl)cyclohexane It can be seen that Comparative Examples 1 and 2 using a primary amine are incapable of heat molding, whereas the thiourethane urea molded product of the present invention using an amine having two secondary amino groups can be obtained from a thermoplastic resin by heat molding, and a transparent resin is obtained (Comparison between Examples 1 to 3 and Comparative Example 1, or between Examples 8 to 10 and Comparative Example 2). It can also be seen that when compared with Comparative Examples 3 and 4 using an alcohol, the thiourethane urea molded product of the present invention has good chemical resistance and low water absorbency, and therefore surface deformation occurred during long-term storage of a plastic lens can be suppressed (Comparison between Examples 1, 13, and 14 and Comparative Example 3, or between Example 2 and Comparative Example 4). It can further be seen that when comparing Examples 1, 13, and 14 with Comparative Examples 5, 6, and 7, the effect of the present invention is obtained by using the polymerizable composition of the present invention in a ratio in a predetermined range.

According to the polymerizable composition for an optical material of the present invention, it is possible to obtain a thiourethane urea molded product, which is comprised of a thermoplastic resin, having excellent moisture absorption resistance, excellent chemical resistance, and low surface deformation during long-term storage.

A thiourethane urea molded product obtained from the polymerizable composition for an optical material according to the present invention can be suitably used in a variety of optical materials where high transparency is required, in particular, eyeglass lenses.

This application claims priority based on Japanese Patent Application No. 2014-140780 filed on Jul. 8, 2014, the disclosure of which is incorporated herein in its entirety.

The invention claimed is:

1. A polymerizable composition for an optical material, comprising:
   (A) a bifunctional amine having two secondary amino groups;
   (B) a bifunctional thiol having two mercapto groups; and
   (C) a bifunctional isocyanate having two isocyanato groups,
   wherein the thiol (B) is one or more compounds selected from ethylene glycol bis(3-mercaptopropionate), tetraethylene glycol bis(3-mercaptopropionate), and bis(2-mercaptoethyl)sulfide; and
   wherein the ratio ((a+b)/c) of the total molar number (a+b) of the molar number a of amino groups in the amine (A) and the molar number b of mercapto groups in the thiol (B) with respect to the molar number c of isocyanato groups in the isocyanate (C) is in the range of 0.85 to 1.15, and the ratio (a/c) of the molar number a of amino groups in the amine (A) with respect to the molar number c of isocyanato groups in the isocyanate (C) is in the range of 0.10 to 0.60.

2. The polymerizable composition for an optical material according to claim 1, wherein the amine (A) is one or more compounds selected from a secondary aliphatic amine, a secondary alicyclic amine, and a secondary aromatic amine.

3. The polymerizable composition for an optical material according to claim 1, wherein the amine (A) has two secondary amino groups represented by the formula: —NHR, and two R's may be the same or different from each other and are selected from an isopropyl group, a 1,2,2-trimethylpropyl group, a tert-butyl group, a sec-butyl group, and a 1,3-dimethylbutyl group.

4. The polymerizable composition for an optical material according to claim 1, wherein the amine (A) is one or more compounds selected from N,N'-di-tert-butyl-ethylenediamine, N,N'-di(1,2,2-trimethylpropyl)-1,6-hexamethylenediamine, N,N'-di-isopropyl-m-xylylenediamine, N,N'-di-sec-butyl-m-xylylenediamine, N,N'-(cyclohexyl-1,3-diylbis(methylene))bis(isopropyl-2-amine), N,N'-(cyclohexyl-1,3-diylbis(methylene))bis(sec-propyl-2-amine), N,N'-(cyclohexyl-1,4-diylbis(methylene))bis(isopropyl-2-amine), N,N'-(cyclohexyl-1,4-diylbis(methylene))bis(sec-propyl-2-amine), N,N'-di-isopropyl-isophorone diamine, N,N'-di-sec-butyl-4,4'-methylene-bis(cyclohexylamine), N,N'-di-sec-butyl-4,4'-methylene-bis(2-methylcyclohexylamine), N,N'-di-isopropyl-2,5-diaminomethyl-bicyclo[2.2.1]heptane, N,N'-di-sec-butyl-2,5-diaminomethyl-bicyclo[2.2.1]heptane, N,N'-di-isopropyl-2,6-diaminomethyl-bicyclo[2.2.1]heptane, N,N'-di-sec-butyl-2,6-diaminomethyl-bicyclo[2.2.1]heptane, and N,N'-di-sec-butyl-4,4'-diaminodiphenylmethane.

5. The polymerizable composition for an optical material according to claim 1, wherein the isocyanate (C) is one or more compounds selected from m-xylylene diisocyanate, 2,5-bis(isocyanatomethyl)bicyclo[2.2.1]heptane, 2,6-bis(isocyanatomethyl)bicyclo[2.2.1]heptane, 1,3-bis(isocyanatomethyl)cyclohexane, 1,4-bis(isocyanatomethyl)cyclohexane, isophorone diisocyanate, 4,4'-methylene-bis(cyclohexyl isocyanate), 1,5-pentane diisocyanate, 1,6-hexamethylene diisocyanate, 2,4-tolylene diisocyanate, and 2,6-tolylene diisocyanate.

6. The polymerizable composition for an optical material according to claim 1, wherein the ratio (a/c) of the molar number a of amino groups in the amine (A) with respect to the molar number c of isocyanato groups in the isocyanate (C) is in the range of 0.10 to 0.50.

7. The polymerizable composition for an optical material according to claim 1, wherein the ratio ((a+b)/c) of the total molar number (a+b) of the molar number a of amino groups in the amine (A) and the molar number b of mercapto groups in the thiol (B) with respect to the molar number of isocyanato groups c in the isocyanate (C) is in the range of 0.90 to 1.10.

8. A thermoplastic resin composition obtained by polymerizing the polymerizable composition for an optical material according to claim 1.

9. A molded product obtained from the polymerizable composition for an optical material according to claim 1.

10. An optical material comprised of the molded product according to claim 9.

11. A plastic lens comprised of the molded product according to claim 9.

12. A process for producing a polymerizable composition for an optical material, comprising:
    a step (i) of preparing a solution containing a bifunctional isocyanate having two isocyanato groups (C); and
    a step (ii) of adding and mixing a bifunctional amine having two secondary amino groups (A) and a thiol (B) into the solution,
    wherein the thiol (B) is one or more compounds selected from ethylene glycol bis(3-mercaptopropionate), tetraethylene glycol bis(3-mercaptopropionate), and bis(2-mercaptoethyl)sulfide; and
    wherein the ratio ((a+b)/c) of the total molar number (a+b) of the molar number a of amino groups in the amine (A) and the molar number b of mercapto groups in the thiol (B) with respect to the molar number c of isocyanato groups in the isocyanate (C) is in the range of 0.85 to 1.15, and the ratio (a/c) of the molar number a of amino groups in the amine (A) with respect to the molar number c of isocyanato groups in the isocyanate (C) is in the range of 0.10 to 0.60.

13. The process for producing a polymerizable composition for an optical material according to claim 12, wherein the amine (A) is one or more compounds selected from a secondary aliphatic amine, a secondary alicyclic amine, and a secondary aromatic amine.

14. The process for producing a polymerizable composition for an optical material according to claim 12, wherein the amine (A) has two secondary amino groups represented by the formula: —NHR, and two R's may be the same or different from each other and are selected from an isopropyl group, a 1,2,2-trimethylpropyl group, a tert-butyl group, a sec-butyl group, and a 1,3-dimethylbutyl group.

15. The process for producing a polymerizable composition for an optical material according to claim 12, wherein the amine (A) is one or more compounds selected from N,N'-di-tert-butyl-ethylenediamine, N,N'-di(1,2,2-trimethylpropyl)-1,6-hexamethylenediamine, N,N'-di-isopropyl-m-xylylenediamine, N,N'-di-sec-butyl-m-xylylenediamine, N,N'-(cyclohexyl-1,3-diylbis(methylene))bis(isopropyl-2-amine), N,N'-(cyclohexyl-1,3-diylbis(methylene))bis(sec-propyl-2-amine), N,N'-(cyclohexyl-1,4-diylbis(methylene))bis(isopropyl-2-amine), N,N'-(cyclohexyl-1,4-diylbis(methylene))bis(sec-propyl-2-amine), N,N'-di-isopropyl-isophorone diamine, N,N'-di-sec-butyl-4,4'-methylene-bis(cyclohexylamine), N,N'-di-sec-butyl-4,4'-methylene-bis(2-methylcyclohexylamine), N,N'-di-isopropyl-2,5-diaminomethyl-bicyclo[2.2.1]heptane, N,N'-di-sec-butyl-2,5-diaminomethyl-bicyclo[2.2.1]heptane, N,N'-di-isopropyl-2,6-diaminomethyl-bicyclo[2.2.1]heptane, N,N'-di-sec-butyl-2,6-diaminomethyl-bicyclo[2.2.1]heptane, and N,N'-di-sec-butyl-4,4'-diaminodiphenylmethane.

* * * * *